US011881139B2

(12) United States Patent
Jo et al.

(10) Patent No.: US 11,881,139 B2
(45) Date of Patent: Jan. 23, 2024

(54) ELECTRONIC APPARATUS AND CONTROL METHOD THEREOF

(71) Applicants: Samsung Electronics Co., Ltd., Suwon-si (KR); INDUSTRY-ACADEMIC COOPERATION FOUNDATION, YONSEI UNIVERSITY, Seoul (KR)

(72) Inventors: Younghun Jo, Suwon-si (KR); Yoonsik Choe, Seoul (KR); Shinhaeng Kim, Suwon-si (KR); Youngsu Moon, Suwon-si (KR); Byungseok Min, Suwon-si (KR); Gihwan Lee, Seoul (KR); Sangsu Lee, Suwon-si (KR)

(73) Assignees: Samsung Electronics Co., Ltd., Suwon-si (KR); Industry-Academic Cooperation Foundation Yonsei University, Seoul (KR)

( * ) Notice: Subject to any disclaimer, the term of this patent is extended or adjusted under 35 U.S.C. 154(b) by 0 days.

(21) Appl. No.: 17/891,252

(22) Filed: Aug. 19, 2022

(65) Prior Publication Data

US 2022/0406237 A1 Dec. 22, 2022

Related U.S. Application Data

(63) Continuation of application No. PCT/KR2020/019039, filed on Dec. 23, 2020.

(30) Foreign Application Priority Data

Feb. 19, 2020 (KR) ........................ 10-2020-0020340

(51) Int. Cl.
*G09G 3/20* (2006.01)
*G09G 3/00* (2006.01)

(52) U.S. Cl.
CPC ............... *G09G 3/20* (2013.01); *G09G 3/007* (2013.01); *G09G 2320/045* (2013.01);
(Continued)

(58) Field of Classification Search
CPC .... G09G 3/20; G09G 3/007; G09G 2320/045; G09G 2320/046; G09G 2320/048;
(Continued)

(56) References Cited

U.S. PATENT DOCUMENTS

2004/0196373 A1 10/2004 Okano
2005/0093850 A1 5/2005 Mori et al.
(Continued)

FOREIGN PATENT DOCUMENTS

KR 10-2015-0066742 6/2015
KR 10-2017-0135418 12/2017
(Continued)

OTHER PUBLICATIONS

International Search Report for PCT/KR2019/019039 dated Apr. 15, 2021, 4 pages.
(Continued)

*Primary Examiner* — Adam R. Giesy
(74) *Attorney, Agent, or Firm* — Nixon & Vanderhye P.C.

(57) ABSTRACT

According to an embodiment of the disclosure, an electronic apparatus may include: a display configured to display an image; and a processor configured to: adjust, for each of sub areas having a specified size in an image quality degradation anticipation area of an image, a pixel value of at least one adjustment pixel among a plurality of pixels included in each sub area, and change the adjustment pixel into another pixel among the plurality of pixels, while maintaining a representative value of the plurality of pixels included in each sub area.

13 Claims, 4 Drawing Sheets

(52) U.S. Cl.
CPC . *G09G 2320/046* (2013.01); *G09G 2320/048* (2013.01); *G09G 2330/10* (2013.01)

(58) Field of Classification Search
CPC ......... G09G 2330/10; G09G 2320/043; G09G 2360/16; G09G 5/00; G09G 5/001; G09G 3/2074; G09G 2320/029; G09G 2320/0693
See application file for complete search history.

(56) References Cited

U.S. PATENT DOCUMENTS

| | | | | |
|---|---|---|---|---|
| 2010/0053166 | A1* | 3/2010 | Tanaka .................. | G06T 3/4053 345/611 |
| 2010/0060554 | A1 | 3/2010 | Koh et al. | |
| 2010/0061638 | A1* | 3/2010 | Tanaka .................. | G06T 3/4053 382/199 |
| 2016/0335965 | A1* | 11/2016 | Huang ................. | G09G 3/3208 |
| 2017/0345378 | A1 | 11/2017 | Ryu et al. | |
| 2019/0057493 | A1* | 2/2019 | Gim ......................... | G09G 5/10 |
| 2019/0057652 | A1 | 2/2019 | Lee | |

FOREIGN PATENT DOCUMENTS

| | | |
|---|---|---|
| KR | 10-2018-0013527 | 2/2018 |
| KR | 10-2019-0019438 | 2/2019 |

OTHER PUBLICATIONS

Written Opinion of the ISA for PCT/KR2019/019039 dated Apr. 15, 2021, 4 pages.

* cited by examiner

ELECTRONIC APPARATUS AND CONTROL METHOD THEREOF

CROSS-REFERENCE TO RELATED APPLICATIONS

This application is a continuation of International Application No. PCT/KR2020/019039 designating the United States, filed on Dec. 23, 2020, in the Korean Intellectual Property Receiving Office and claiming priority to Korean Patent Application No. 10-2020-0020340, filed on Feb. 19, 2020 in the Korean Intellectual Property Office, the disclosures of which are incorporated by reference herein in their entireties.

BACKGROUND

Field

The disclosure relates to an electronic apparatus and a control method thereof which prevent and/or reduce a degradation phenomenon of an image displayed on a display.

Description of Related Art

Recently, a display has been applied to various electronic apparatuses such as a mobile phone, a monitor, etc. An organic light-emitting diode (OLED) display which is one of the displays is suitable for a next generation display because the display emits light by itself without a back light. However, in a long-term view may happen a partial quality degradation which is so called as a burn-in or image retention. For example, a program title or broadcaster name which is displayed on a top of the display of a television, or, in the case of a smartphone, a logo of a communication company, a signal strength, an amount of remained battery, etc. is always displayed at a same position. Accordingly, pixels which exist at a fixed area may be deteriorated in functions, e.g., degradation, etc., in contrast to pixels at an area where luminance is continuously changed. Because of this, when playing a content such as video which uses all of a screen, a top portion of a smartphone has a pixel becomes degraded and seems to be stained.

Accordingly, although an original image of a high quality is displayed, a stain happens on a part of the display, which decreases the quality of all the image. Also, as a demand for a high resolution display increases, the quality of an output image has been higher. Accordingly, it has been more important to solve a problem regarding a burn-in phenomenon of the display and more delicate luminance adjustment is required as the quality of all the image increases. As a conventional method of preventing the burn-in image quality deterioration to address the described problem, there has been used a pixel shift technique to move an image on a display panel at a periodic interval and display the image, a luminance reduction technique to decrease the luminance of an area so as to extend a lifespan, etc.

SUMMARY

Embodiments of the disclosure provide an electronic apparatus and a control method thereof which more effectively prevent and/or reduce the degradation phenomenon of an image that is displayed on a display.

According to an example embodiment of the disclosure, an electronic apparatus may include: a display configured to display an image; and a processor configured to: adjust, for each of sub areas having a specified size in an image quality degradation anticipation area of an image, a pixel value of at least one adjustment pixel among a plurality of pixels included in each sub area; and change the adjustment pixel into another pixel among the plurality of pixels, while maintaining a representative value of the plurality of pixels included in each sub area.

The processor may be configured to move the adjustment pixel according to a specified path in the sub area.

The processor may be configured to gradually decrease the pixel value of the adjustment pixel.

The processor may be configured to gradually decrease the pixel value of the adjustment pixel for each of a plurality of sections.

The processor may be configured to maintain the representative value of the plurality of pixels of each sub area for each section.

The processor may be configured to rotate the adjustment pixel for each section according to a movement path in each sub area.

The representative value of the plurality of pixels may be an average value of a luminance value of the plurality of pixels.

The processor may be configured to exchange both pixel values of the adjustment pixel and another adjacent pixel among the plurality of pixels in the sub area.

The processor may be configured to adjust the pixel value of the adjustment pixel based on a target change amount of the pixel value and a time which corresponds to a number of the plurality of pixels included in the area.

The image quality degradation anticipation area may include an area in the image which is steadily displayed over a threshold time.

According to an example embodiment of the disclosure, a method of controlling an electronic apparatus may include: adjusting, for each of sub areas having a specified size in an image quality degradation anticipation area of an image, a pixel value of at least one adjustment pixel among a plurality of pixels included in each sub area, and changing the adjustment pixel into another pixel among the plurality of pixels, while maintaining a representative value of the plurality of pixels included in each sub area.

The changing the adjustment pixel into the other pixel among the plurality of pixels may include moving the adjustment pixel according to a specified path in the sub area.

The adjusting the pixel value of the at least one adjustment pixel among the plurality of pixels which is included in each sub area may include gradually decreasing the pixel value of the adjustment pixel.

The gradually decreasing the pixel value of the adjustment pixel may include gradually decreasing the pixel value of the adjustment pixel for each of a plurality of sections.

The adjusting the pixel value of the at least one adjustment pixel among the plurality of pixels which is included in each sub area may include maintaining the representative value of the plurality of pixels of each sub area for each section.

The changing the adjustment pixel into the other pixel among the plurality of pixels may include rotating the adjustment pixel for each section according to a movement path in each sub area.

The changing the adjustment pixel into the other pixel among the plurality of pixels may include exchanging both pixel values of the adjustment pixel and another adjacent pixel among the plurality of pixels in the sub area.

The adjusting the pixel value of the at least one adjustment pixel among the plurality of pixels which is included in each sub area may include adjusting the pixel value of the adjustment pixel based on a target change amount of the pixel value and a time which corresponds to a number of the plurality of pixels included in the area.

According to various example embodiments is possible to delicately prevent and/or reduce the degradation phenomenon in an area where the degradation of an image displayed on a display occurs.

Further, since a pixel movement is performed as well as achieving a bit expansion effect, more delicate and fine pixel value adjustment is possible.

Further, it is possible to determine an adjustment ratio of a pixel value by adjusting a number of pixels within a sub area. Also, the ratio may be differently adjusted according to time so as to minimize and/or reduce a visual perception and an actual feeling of image quality deterioration due to a luminance change while watching and to extend a lifespan of a display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
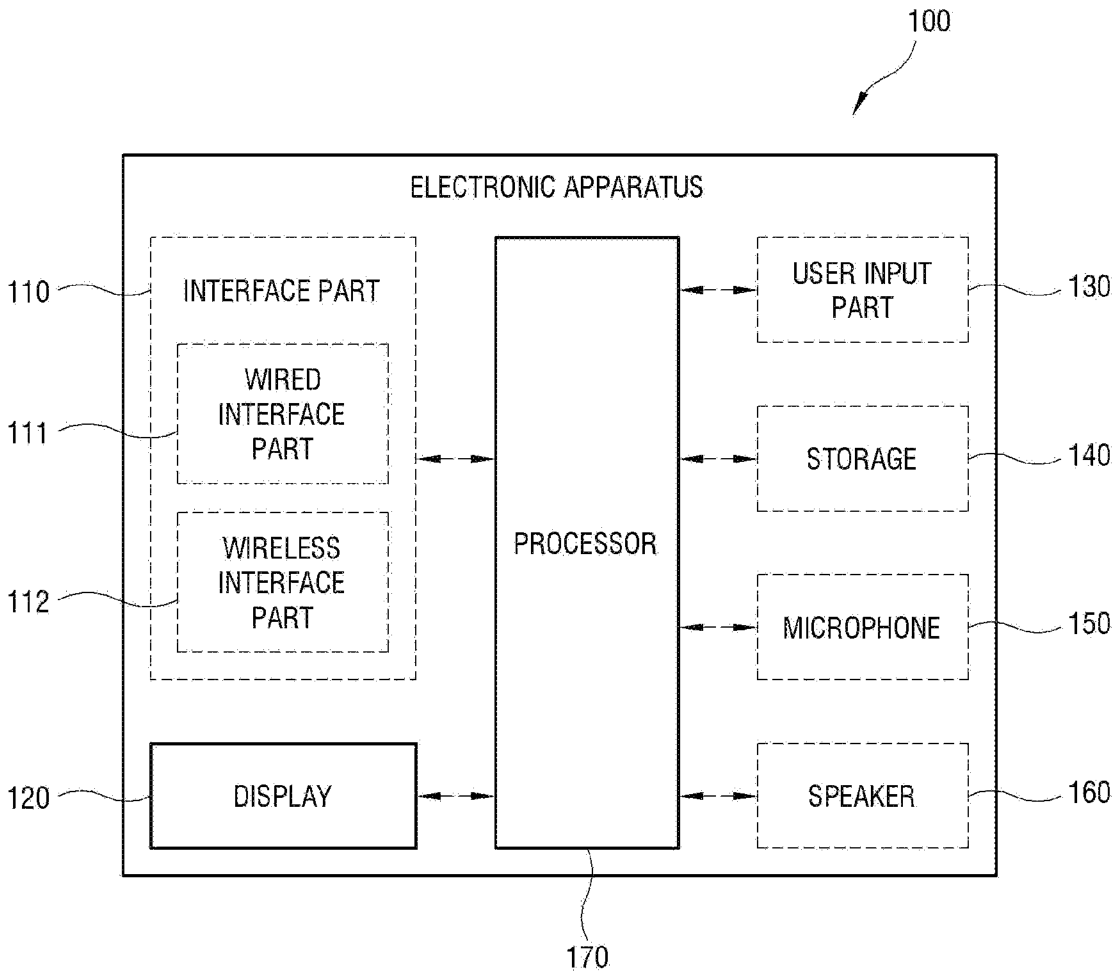
FIG. 1 is a block diagram illustrating an example configuration of an electronic apparatus according to various embodiments.

Below, various example embodiments of the disclosure will be described in greater detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments. In the following descriptions, details about publicly known technologies or configurations may be omitted if they unnecessarily obscure the gist of the disclosure.

In the following embodiments, terms 'first', 'second', etc. are used simply to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module for at least one processor. Also, in the disclosure, a term "at least one" of a plurality of elements refers to all of the plurality of elements as well as each excluding other remainders or any combinations of the plurality of elements.

FIG. 1 is a block diagram illustrating an example configuration of an electronic apparatus according to various embodiments.

The electronic apparatus 100 may be embodied as a display apparatus which is capable of displaying an image. For example, the electronic apparatus 100 may include a television, a computer, a smartphone, a tablet computer, a portable media player, a wearable device, a video wall, an electronic picture frame, etc.

As illustrated in FIG. 1, the electronic apparatus 100 may include an interface part (e.g., including interface circuitry) 110. The interface part 110 may include a wired interface part 111. The wired interface part 111 may include a connector or port to which an antenna for receiving a broadcast signal based on broadcasting standards for terrestrial/satellite broadcasting, etc. is connected or to which a cable for receiving a broadcast signal based on cable broadcasting standards is connected. The electronic apparatus 100 may include a built-in antenna to receive a broadcast signal. The wired interface part 111 may include a connector or port according to video and/or audio transmission standards such as a high definition multimedia interface (HDMI) port, a DisplayPort, a digital visual interface (DVI) port, thunderbolt, composite video, component video, super video, Syndicat des Constructeurs d'Appareils Radiorécepteurs et Téléviseurs (SCART), etc. The wired interface part 111 may include a connector or port, etc. according to universal data transmission standards such as a universal serial bus (USB) port. The wired interface part 111 may include a connector or port, etc. to which an optical cable according to optical transmission standards is connected. The wired interface part 111 may include a connector or port, etc. which connects with an external microphone or an external audio device including a microphone, and receives an audio signal from the audio device. The wired interface part 111 may include a connector or port, etc. which connects with an audio device such as a headset, an earphone, an external loudspeaker, etc. and transmits or outputs an audio signal to the audio device. The wired interface part 111 may include a connector or port according to network transmission standards such as Ethernet. For example, the wired interface part 111 may be embodied as a local area network (LAN) card or the like which is connected to a router or gateway by a wire.

The wired interface part 111 may be connected to a set-top box, an optical media player or the like external device, a loudspeaker, a server, etc. in a manner of 1:1 or 1:N (where, N is a natural number) through the foregoing connectors or ports by a wire, thereby receiving a video/audio signal from the connected external device or transmitting a video/audio signal to the connected external device. The wired interface part 111 may include connectors or ports to transmit the video/audio signals individually.

Further, according to an embodiment, the wired interface part 111 may be internally provided in the electronic apparatus 100, or may be provided in a form of a dongle or module so as to be detachable to a connector of the electronic apparatus 100.

The interface part 110 may include a wireless interface part (e.g., including wireless interface circuitry) 112. The wireless interface part 112 may be variously embodied in correspondence to an embodied form of the electronic apparatus 100. For example, the wireless interface part 112 may use wireless communication methods such as Radio frequency (RF), Zigbee, Bluetooth, Wi-Fi, Ultra-wideband (UWB), Near-field communication (NFC), etc. The wireless interface part 112 may be embodied as a wireless communication module which performs a wireless communication with an access point (AP) according to a Wi-Fi protocol, a wireless communication module which performs a one-to-one direct wireless communication such as Bluetooth, etc. The wireless interface part 112 may perform a wireless communication with a server on a network to exchange a data packet with the server. The wireless interface part 112 may include an infrared (IR) transmitter and/or an IR receiver to transmit and/or receive an IR signal according to an IR communication standard. The wireless interface part 112 may, through the IR transmitter and/or the IR receiver, receive or input a remote control signal from a remote controller or another external device or transmit or output the remote control signal to the other external device. Alternatively, the electronic apparatus 100 may transmit and/or receive the remote control signal with the remote controller or the other external device through the wireless interface part 112 of a different standard such as Wi-Fi, Bluetooth, etc.

The electronic apparatus 100 may, in the case of the video/audio signal received through the interface part 110 being a broadcast signal, further include a tuner to tune to the received broadcast signal for each channel.

The electronic apparatus 100 may include a display 120. The display 120 may include a display panel capable of displaying an image on a screen. The display panel is provided to have a light receiving structure such as a liquid crystal type, or a self-emissive structure such as an organic light emitting diode (OLED) type. The display 120 may include an additional element according to a structure of the display panel. For example, if the display panel is the liquid crystal type, the display 120 includes a liquid crystal display panel, a backlight unit which supplies light, and a panel driving substrate which drives a liquid crystal of the liquid crystal display panel.

The electronic apparatus 100 may include a user input part (e.g., including user input circuitry) 130. The user input part 130 includes various kinds of input interface-related circuitry which is provided to perform with a user input. The user input part 130 may be variously configured according to the kind of electronic apparatus 100, and may include, for example, a mechanical or electronical button of the electronic apparatus 100, a remote controller separated from the electronic apparatus 100, an input part provided in an external device connected to the electronic apparatus 100, a touch pad, a touch screen installed in the display 120, etc.

The electronic apparatus 100 may include a storage unit (e.g., a memory) 140. The storage unit 140 stores digitalized data. The storage unit 140 includes a nonvolatile storage which allows data to be retained regardless of whether power is provided or not, and a volatile memory into which data to be processed by a processor 170 is loaded and which does not allow data to be retained unless power is provided. As the storage, there are a flash memory, a hard-disc drive (HDD), a solid-state drive (SSD), a read only memory (ROM), etc., and as the memory, there are a buffer, a random-access memory (RAM), etc.

The electronic apparatus 100 may include a microphone 150. The microphone 150 collects a voice of a user as well as a sound of an external environment. The microphone 150 transmits a signal of a collected sound to the processor 170. The electronic apparatus 100 may include the microphone 150 for collecting the voice of a user, or receive an audio signal through the interface part 110 from an external apparatus such as a remote controller, a smartphone or the like which has a microphone. It may be possible to install a remote-control application at an external apparatus and to control the electronic apparatus 100 or allow a voice recognition function or the like to be performed. In the case of the application being installed, the external apparatus is capable of receiving the voice of a user and transmitting and/or receiving and controlling data with the electronic apparatus 100 using Wi-Fi, Bluetooth, IR, etc. Thus, in the electronic apparatus 100 may be present a plurality of interface parts 110 which can be embodied with the communication methods.

The electronic apparatus 100 may include a speaker 160. The speaker 160 outputs a sound based on audio data which is processed by the processor 170. The speaker 160 may include a unit speaker provided which is provided to correspond to audio data of an audio channel and may include a plurality of unit speakers which correspond to audio data of a plurality of audio channels, respectively. According to an alternative embodiment, the speaker 160 may be provided separately from the electronic apparatus 100, and, in this case, the electronic apparatus 100 may transmit the audio data to the speaker 160 through the interface part 110.

The electronic apparatus 100 may include the processor (e.g., including processing circuitry) 170. The processor 170 may include one or more hardware processors which are embodied as a central processing unit (CPU), a chipset, a buffer, a circuit, etc. that are mounted onto a printed circuit board, and may be embodied as a system on chip (SoC). In the case of the electronic apparatus 100 being embodied as a display apparatus, the processor 170 includes modules which correspond to various processes such as a demultiplexer, a decoder, a scaler, an audio digital signal processor (DSP), an amplifier, etc. Here, some or all of such modules may be embodied as an SOC. For example, the module such as the demultiplexer, the decoder, the scaler, etc. which relates to image processing may be embodied as an image processing SOC, whereas the audio DSP may be embodied as a chipset which is separate from the SOC.

The processor 170 may include various processing circuitry and convert an audio signal into audio data when the audio signal of a user voice is obtained through the microphone 150, etc. At this time, the audio data may be text data which is obtained by a speech-to-text (STT) process that converts the audio signal into the text data. The processor 170 identifies a command which is indicated by the audio data, and performs an operation according to the identified command. The process for the audio data and the identifying and performing process for the command may be all executed in the electronic apparatus 100. In this case, however, because a system load and a storage capacity that are required for the electronic apparatus 100 become relatively large, at least a part of the processes may be performed by at least one server which is capable of connecting to and communicating with the electronic apparatus 100 through a network.

The processor 170 according to the disclosure may call and execute at least one among software instructions stored in a storage medium which is readable by a machine such as the electronic apparatus 100. This enables a device such as the electronic apparatus 100 to operate to perform at least one function according to the at least one called instruction. The one or more instructions may include a code which is produced by a compiler or is executable by an interpreter. The machine-readable storage medium may be provided in a form of a non-transitory storage medium. Here, the 'non-transitory' storage medium is a tangible device and may not include a signal, for example, an electromagnetic wave, and this term does not distinguish between cases that data is semi-permanently stored in the storage medium and that data is temporarily stored in the storage medium.

Meanwhile, the processor 170 may use at least one of a machine learning, a neural network, or a deep learning algorithm as a rule-base or artificial intelligence (AI) algorithm to perform at least a part of data analysis, process or result information generation for adjusting, for each of sub areas having a predefined size in an image quality degradation anticipation area of an image, a pixel value of at least one adjustment pixel among a plurality of pixels which is included in each sub area and changing the adjustment pixel into another pixel among the plurality of pixels, while maintaining a representative value of the plurality of pixels included in each sub area.

For example, the processor 170 may function as both a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage 140 or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there may be included a model such as a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to perform the foregoing operations. The target data may be obtained from the storage 140 or from outside. The target data may be data targeted for recognition of the neural network. Before applying the target data to the learned neural network, the recognizer may preprocess the obtained target data or select data to be used in recognition from among a plurality of pieces of target data. For example, the recognizer may process the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. The recognizer may obtain a probability value or a reliability value together with the output value.

As an example embodiment, the control method of the electronic apparatus 100 according to the disclosure may be provided as included in a computer program product. The computer program product may include software instructions to be executed by the processor 170 as described above. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product may be transitorily stored or temporarily produced in a machine-readable storage medium such as a memory of a manufacturer server, an application-store server, or a relay server.

Figure 2:
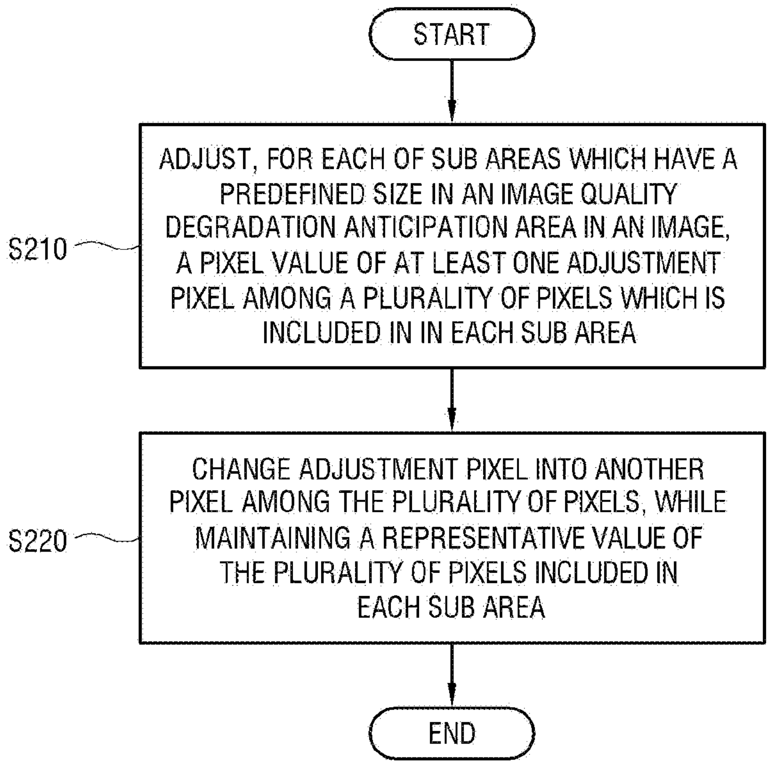
FIG. 2 is a flowchart illustrating an example operation of the electronic apparatus according to various embodiments.

FIG. 2 is a flowchart illustrating an example operation of the electronic apparatus according to various embodiments. The processor 170 of the disclosure may control the display to display an image based on an image signal on a screen.

The processor 170 may adjust, for each of sub areas which have a predefined (e.g., specified) size in an image quality degradation anticipation area in the image, a pixel value of at least one adjustment pixel among a plurality of pixels which is included in in each sub area (S210). The image quality degradation anticipation area may include an area on which the image is steadily displayed over a predefined threshold time. For example, in the case of a television, the image quality degradation anticipation area may be an area which indicates a program title or broadcaster name that is displayed on a top of the display, or, in the case of a smartphone, an area which indicates a logo of a communication company, a signal strength, an amount of remained battery, etc. that is displayed on a top of the display. The processor 170 may identify the image quality degradation anticipation area using an image change detection method. The image change detection method may be to detect a change degree of a pixel value between image frames. The processor 170 may identify, as the image quality degradation anticipation area, an area where the change degree of the pixel value between image frames is less than a predefined value.

The sub area may include a plurality of pixels and is an area which divides the image quality degradation anticipation area in the image. Accordingly, each sub area may not always have a same size but may have a different size. A pixel whose pixel value is to be adjusted among the plurality of pixels included in each sub area is referred to as an adjustment pixel. The processor 170 may adjust the pixel value of at least one adjustment pixel among the plurality of pixels included in each sub area.

The processor 170 may change the adjustment pixel into another pixel among the plurality of pixels, while maintaining a representative value of the plurality of pixels included in each sub area (S220). The representative value of a pixel may be, for example, an average value of a luminance value of the plurality of pixels forming each sub area, but is not limited to anyone. The change of the adjustment pixel into another pixel will be described later in detail.

The suggested method may include a dithering method. Dithering is a technique which is used to cause an illusion in regard to a shade change of a color when displaying an image. When colors are mixed, there is used a tendency of human eyes which perceives the colors as a single shade or color by averaging or uniting every effect. If the dithering method is used in a conventional RGB domain, it is possible to naturally express a desired color without a foreign feeling using other neighboring colors though there is not an actual color. Utilizing this method, although the processor 170 adjusts the luminance of a few pixels in a luminance space in a block of the image, it allows to see as if all of the block has a same luminance visually. At this time, because of using the dithering method which makes change more delicately in contrast to a method of simply decreasing all the pixel values, it allows a user not to perceive a foreign feeling visually.

Therefore, according to an embodiment of the disclosure, because the dithering method is utilized in changing the luminance value of the pixel and moving the pixel, it is possible to delicately prevent and/or reduce degradation of the pixel which may be exist in the image quality degradation anticipation area without a foreign feeling.

Figure 3:
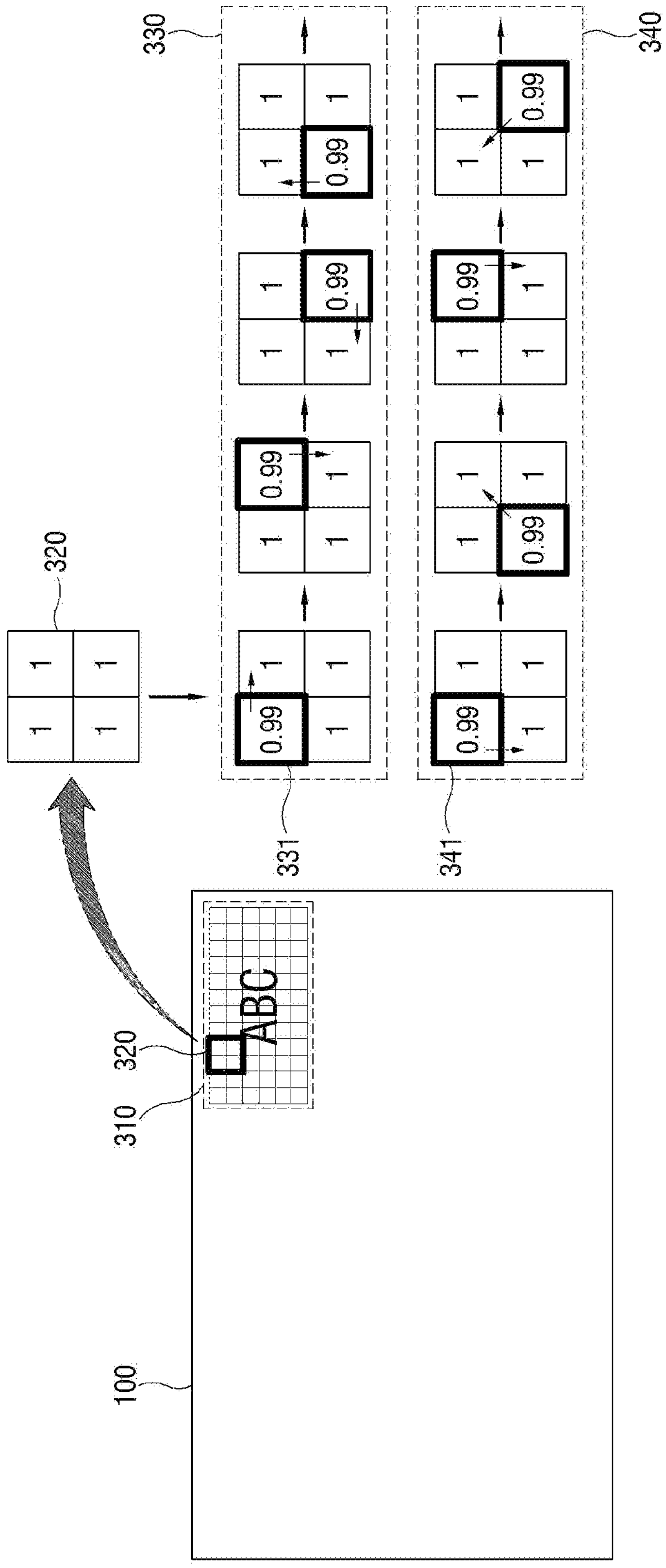
FIG. 3 is a diagram illustrating an example operation of the electronic apparatus according to various embodiments.

FIG. 3 is a diagram illustrating an example operation of the electronic apparatus according to various embodiments. In this figure are illustrated an image quality degradation anticipation area 310 on the display of the electronic apparatus 100 and image quality degradation prevention/reduction operations 330, etc. in a sub area 320. The processor 170 may identify as the image quality degradation anticipation area 310 an area which includes an area where "ABC" is displayed. FIG. 3 illustrates adjustment of the pixel value which is successively performed in the single sub area 320 and movement processes of the adjustment pixel which are arranged in time sequence. As illustrated in FIG. 3, the sub area 320 may include 2×2 pixels whose pixel values are all 1. In the disclosure, the pixel value of the pixel is, for the purpose of description, a value which is normalized from an actual pixel value where a reference value is set as 1. Also, the operation 330 indicates states, which are arranged as time lapses, where an adjustment pixel 331 moves in each sub area 320 at four time points. In the operation 330, the processor 170 sequentially moves the adjustment pixel 331 in a form as illustrated in each sub area 320. A time which corresponds to four times of movements of the adjustment pixel 331 may be set to be a section and the processor 170 allows the adjustment pixel 331 to rotate for the section according to a movement path in the sub area 320. At this time, the processor 170 may move the adjustment pixel 331 for the single section in a constant or irregular period, which is not limited to any one method. Also, the processor 170 may consider a luminance change amount to aim for the image quality degradation prevention/reduction and decide a length of the section to adjust the pixel value or a time interval to move the adjustment pixel 331 in the single section, etc.

Referring to the operation 330, the processor 170 may adjust a pixel value of at least one adjustment pixel 331 among a plurality of pixels which is included in the sub area 320. The processor 170 may adjust the pixel value of the adjustment pixel 331 by gradually decreasing the pixel value. In the operation 330, the processor 170 may adjust the pixel value of an adjustment pixel 331 among the plurality of pixels to be from 1 to 0.99. If there occurs an abrupt luminance change such that the processor 170 adjusts the pixel value of the adjustment pixel 331 to be from 1 not to 0.99 but 0.5, users are forced to feel image quality deterioration of an image which is displayed on the screen. Accordingly, the processor 170 is able to adjust the pixel value according to time using the described dithering method. In order to prevent and/or reduce the image quality deterioration of the image, the processor 170 does not abruptly adjust the pixel value but gradually increases a luminance decrease degree according to time based on [Formula 1] below.

$$r_l = I_{rate}^{\ t}$$ [Formula 1]

$r_l$ which is obtained by [Formula 1] is a factor to modify a final pixel value by multiplying the pixel value with the factor that is smaller than 1 in the case of decreasing the luminance of an image quality degradation anticipation area. The processor 170 adjusts the pixel value for each sub area 320 which may include a plurality of pixels. The processor 170 makes the luminance of the pixel become gradually dark according to time and fixes the value independently of time after reaching a target luminance change amount. The operations 330, etc. in FIG. 3 illustrate sections which correspond to changes of a part of a total luminance change amount, and as illustrated later in FIG. 4, if the operations 330, etc. are repeatedly performed in the plurality of sections, it is possible to reach a target luminance change amount.

At this time, [Formula 1] is not applied to each pixel but to at least one pixel value in the plurality of sub areas for each time. Additionally, to other pixel values may be applied a decrease rate of a previous period. Also, a change amount of the final pixel value becomes a value which is obtained by dividing [Formula 1] by a number of pixels included in the sub area so that more delicate modification than applying to total pixels is possible.

When all the change amounts in the sub area become uniform, a process to compare to the target luminance change amount is performed. At this time, if a total change amount in the sub area is larger than the target luminance change amount, then the pixel value is not adjusted but constantly maintained. If the target luminance change amount is not reached yet, like the previous repetition, the described process is repeated for a time of a number of pixels in the sub area. After the total processes pass, the final pixel luminance change amount of the sub area becomes equal to [Formula 2] below.

$$r_l = I_{rate}^{\frac{t}{number\ of\ pixels}}$$ [Formula 2]

The processor 170 may change the adjustment pixel 331 into another pixel among the plurality of pixels, while maintaining the representative value of the plurality of pixels which is included in each sub area. At this time, the processor 170 may move the adjustment pixel 331 in the sub area 320 according to a predefined path. In the case of operation 330, the processor 170 may move the adjustment pixel 331 in a clockwise direction. If it is supposed in the disclosure that the representative value of the plurality of pixels is an average value of the pixel values, the adjustment pixel 331 may be moved while maintaining the representative value as (1+1+1+0.99)/4=0.9975. Therefore, according to an embodiment of the disclosure, although the luminance value of a few pixels is changed and the pixels are moved, a total luminance of the sub area is maintained so that it is possible to delicately prevent and/or reduce the degradation of pixels which may be existed in the image quality degradation anticipation area without a foreign feeling.

However, like the operation 340, the predefined path is not limited to anyone. For example, the processor 170 may change the adjustment pixel 341 into another pixel according to a path which has an inverted N shape. However, the example that the adjustment pixel 341, etc. is changed into another pixel among the plurality of pixels is not limited to that illustrated in FIG. 3 but may be embodied variously.

According to an embodiment of the disclosure, the processor 170 may exchange both pixel values of an adjustment pixel and another adjacent pixel among the plurality of pixels in the sub area.

The processor 170 may perform the image quality degradation prevent/reduce operations 330, etc. described above for each sub area 320 with regard to all the image quality degradation anticipation area 310. For example, the processor 170 may simultaneously perform the operations 330, etc. on two or more sub areas 320 of the image quality degradation anticipation area 310 or sequentially perform for each sub area 320, which is not limited to any one method.

According to an embodiment of the disclosure, because the processor 170 is able to continuously change the pixel value of the pixels which form the sub area 320 through the adjustment and movement, it is possible to prevent/reduce that output as a same pixel value is done for a long time and the degradation of the pixels may occur.

Figure 4:
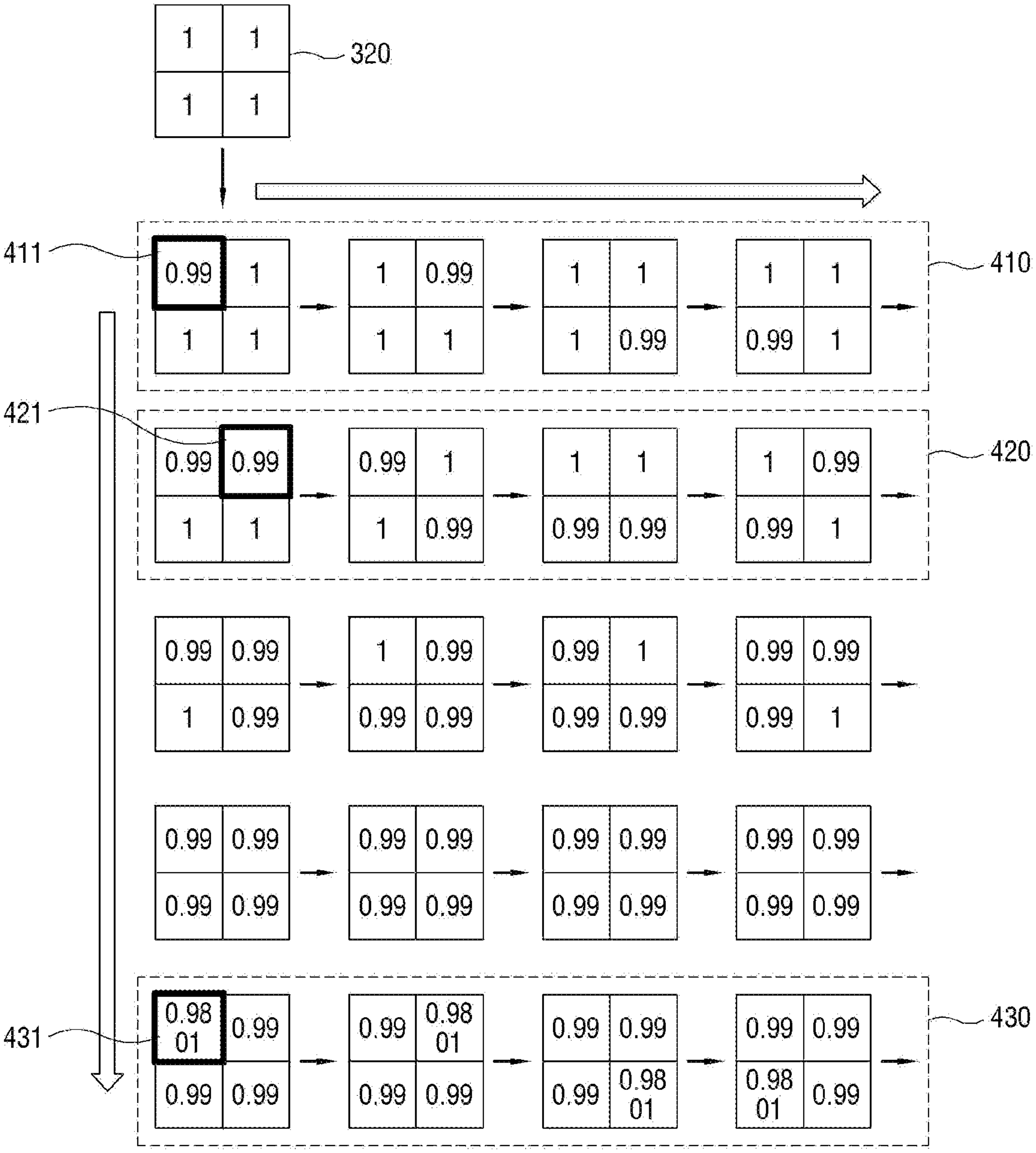
FIG. 4 a diagram illustrating an example operation of the electronic apparatus according to various embodiments.

FIG. 4 is a diagram illustrating an example operation of the electronic apparatus according to various embodiments. FIG. 4 illustrates processes of the adjustment of the pixel value and the movement of the adjustment pixel which are successively performed in a sub area 320, where the processes are illustrated as divided and arranged by a plurality of sections according to time.

While maintaining the representative value of the pixels of the sub area 320 for each section, the processor 170 may gradually decrease the pixel value of the adjustment pixel of the sub area 320 when turning to a next section. For example, referring to a first sub area 320 of each section, the processor 170 may decrease the pixel value of an adjustment pixel 411 in the first sub area 320 of a first section 410 to be from 1 to 0.99 so as to maintain the representative value of the sub area 320 of the first section 410 as (1+1+1+0.99)/4=0.9975, whereas decreasing the pixel value of an adjustment pixel 421 in the first sub area 320 of a second section 420 to be from 1 to 0.99 so as to maintain the representative value of the sub area 320 of the second section 420 as (1+1+0.99+0.99)/4=0.995. Accordingly, the average value which is the representative value of each sub area gradually decreases in an order of 0.9975, 0.995, 0.9925, 0.99 and 0.9875. In this way, as the representative value of each sub area is gradually adjusted, when the total change amount of the pixel value in the sub area becomes larger than the target luminance change amount, the pixel value is not adjusted but constantly maintained thereafter. At this time, the processor 170 may determine a rate of adjustment of the pixel value by modifying a number of pixels in the sub area based on [Formula 1] and [Formula 2] described above, and adjust the rate of adjustment according to time. Therefore, it is not limited, like the embodiment, to the sub area having four pixels or to the rate of adjustment of the pixel value of 1%.

After the pixel value of all pixels in the sub area 320 is adjusted, that is, four sections have been through, the processor 170 may adjust again the pixel value of an adjustment pixel 431 of a fifth section 430 which is the adjustment pixel 411 of the first section 410. As a result, the processor 170 may gradually decrease the pixel value of the adjustment pixel, while gradually decreasing the representative value of the pixels of each section. However, the processor 170 may not gradually only decrease but also increase the pixel value of the pixel, which is not limited to anyone.

After the processor 170 decreases the pixel value of the adjustment pixel in the first sub area 320 of each section, the processor 170 may periodically move each adjustment pixel while maintaining the representative value of the sub area 320.

Consequently, the processor 170 may adjust, for each sub area having the predefined size in the image quality degradation anticipation area with regard to each section, the pixel value of at least one adjustment pixel among the plurality of pixels which is included in each sub area and change the adjustment pixel into another pixel among the plurality of pixels while maintaining the representative value of the plurality of pixels included in each sub area. Also, the processor 170 may gradually decrease or increase the pixel value of the adjustment pixel for each of the plurality of sections.

According to an embodiment of the disclosure, although the pixel value of a part of the image quality degradation anticipation area is adjusted, the position of the pixel is periodically changed while the representative value of the pixels so that a user does not have a foreign feeling visually due to the luminance change in the image quality degradation anticipation area as a whole. Also, because the whole luminance value is decreased as time lapses, it is possible to delicately change the pixel value in contrast to a method of simply decreasing the whole pixel value.

Further, it is possible to determine the rate of adjustment of the pixel value by modifying a number of pixels in the sub area and to minimize and/or reduce a visual perception and an actual feeling of image quality deterioration due to a luminance change while watching and extend a lifespan of a display by differently adjusting the ratio according to time.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:

a display configured to display an image; and a processor configured to:

adjust, for each of sub areas having a specified size in an image quality degradation anticipation area of an image, a pixel value of at least one adjustment pixel among a plurality of pixels included in each sub area; and change the at least one adjustment pixel into another pixel among the plurality of pixels at least by moving the at least one adjustment pixel according to a predetermined movement path in each sub area, while maintaining a representative value base on pixel values of the plurality of pixels included in each sub area.

2. The electronic apparatus according to claim 1, wherein the processor is configured to decrease the pixel value of the at least one adjustment pixel.

3. The electronic apparatus according to claim 2, wherein the processor is configured to decrease the pixel value of the at least one adjustment pixel for each of a plurality of sections.

4. The electronic apparatus according to claim 3, wherein the processor is configured to maintain the representative value base on the pixel values of the plurality of pixels of each sub area for each section.

5. The electronic apparatus according to claim 4, wherein the processor is configured to rotate the at least one adjustment pixel for each section according to the predetermined movement path in each sub area.

6. The electronic apparatus according to claim 1, wherein the representative value base on the pixel values of the plurality of pixels comprises an average value of a luminance value of the plurality of pixels.

7. The electronic apparatus according to claim 1, wherein the image quality degradation anticipation area includes an area in the image which is constantly displayed over a threshold time.

8. An electronic apparatus comprising:

a display configured to display an image; and a processor configured to:

adjust, for each of sub areas having a specified size in an image quality degradation anticipation area of an image, a pixel value of at least one adjustment pixel among a plurality of pixels included in each sub area; and change the at least one adjustment pixel into another pixel among the plurality of pixels, while maintaining a representative value of the plurality of pixels included in each sub area, wherein the processor is configured to exchange both pixel values of the at least one adjustment pixel and another adjacent pixel among the plurality of pixels in the sub area.

9. An electronic apparatus comprising:

a display configured to display an image; and a processor configured to:

adjust, for each of sub areas having a specified size in an image quality degradation anticipation area of an image, a pixel value of at least one adjustment pixel among a plurality of pixels included in each sub area; and change the at least one adjustment pixel into another pixel among the plurality of pixels, while maintaining a representative value of the plurality of pixels included in each sub area, wherein the processor is configured to adjust the pixel value of the at least one adjustment pixel based on a target change amount of the pixel value and a time corresponding to a number of the plurality of pixels included in the area.

10. A method of controlling an electronic apparatus, comprising:

adjusting, for each of sub areas having a specified size in an image quality degradation anticipation area of an image, a pixel value of at least one adjustment pixel among a plurality of pixels included in each sub area, and changing the at least one adjustment pixel into another pixel among the plurality of pixels by moving the at least one adjustment pixel according to a predetermined movement path in each sub area, while maintaining a representative value base on pixel values of the plurality of pixels included in each sub area.

11. The method according to claim 10, wherein the adjusting the pixel value of the at least one adjustment pixel among the plurality of pixels included in each sub area comprises decreasing the pixel value of the at least one adjustment pixel.

12. The method according to claim 11, wherein the decreasing the pixel value of the at least one adjustment pixel comprises decreasing the pixel value of the at least one adjustment pixel for each of a plurality of sections.

13. A method of controlling an electronic apparatus, comprising:

adjusting, for each of sub areas having a specified size in an image quality degradation anticipation area of an image, a pixel value of at least one adjustment pixel among a plurality of pixels included in each sub area, and changing the at least one adjustment pixel into another pixel among the plurality of pixels, while maintaining a representative value of the plurality of pixels included in each sub area, wherein the adjusting the pixel value of the at least one adjustment pixel among the plurality of pixels included in each sub area comprises adjusting the pixel value of the at least one adjustment pixel based on a target change amount of the pixel value and a time corresponding to a number of the plurality of pixels included in the area.

* * * * *